Figure 1:
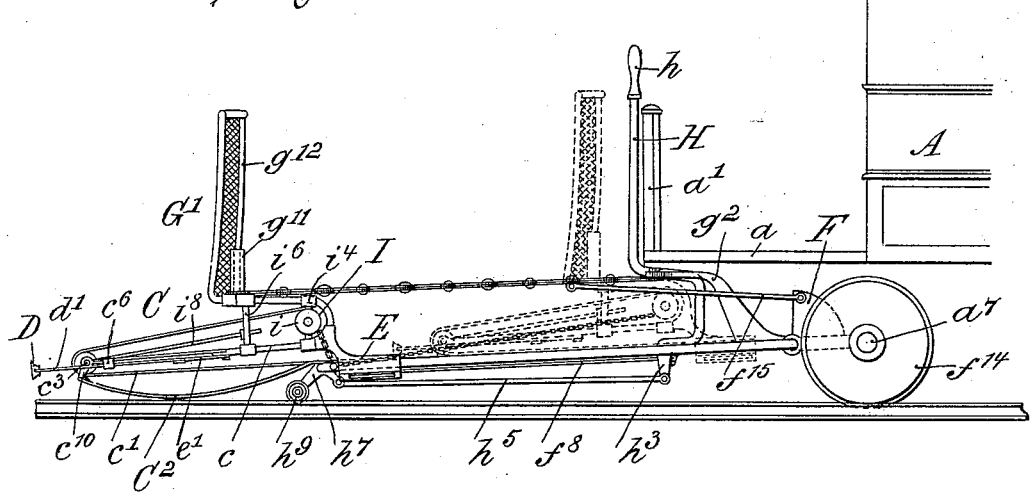

(No Model.)

4 Sheets—Sheet 1.

W. B. THOMAS.
CAR FENDER.

No. 536,665.

Patented Apr. 2, 1895.

Witnesses:
Wilhelm Vogt
Thomas M. Smith

Inventor.
Worthington B. Thomas,
By J. Walter Douglass
Attorney.

(No Model.) 4 Sheets—Sheet 2.
W. B. THOMAS.
CAR FENDER.
No. 536,665. Patented Apr. 2, 1895.
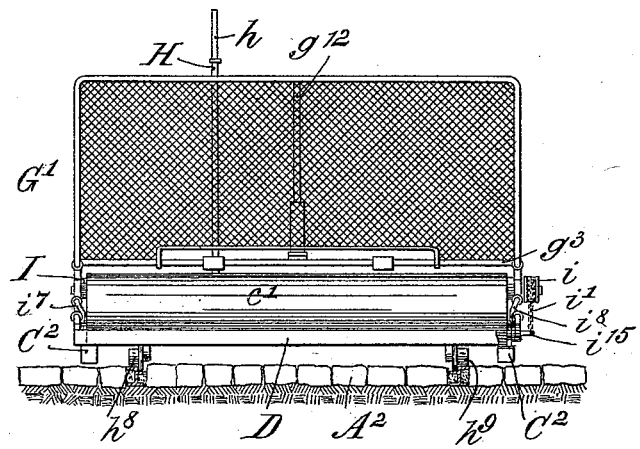
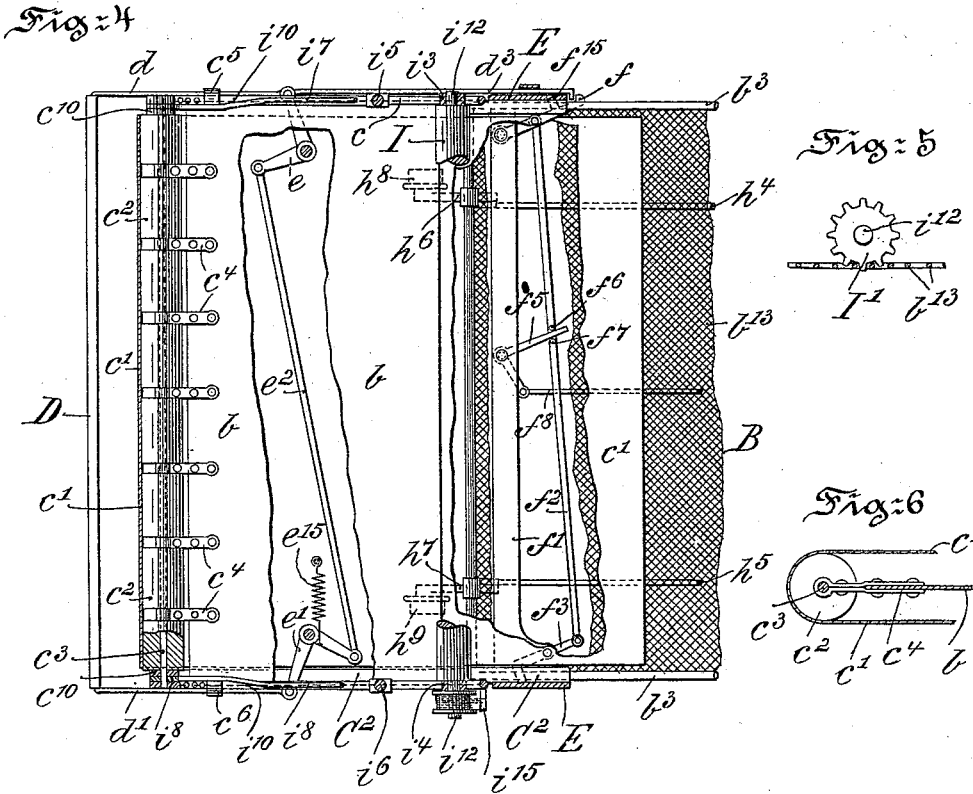

(No Model.) 4 Sheets—Sheet 3.
W. B. THOMAS.
CAR FENDER.
No. 536,665. Patented Apr. 2, 1895.
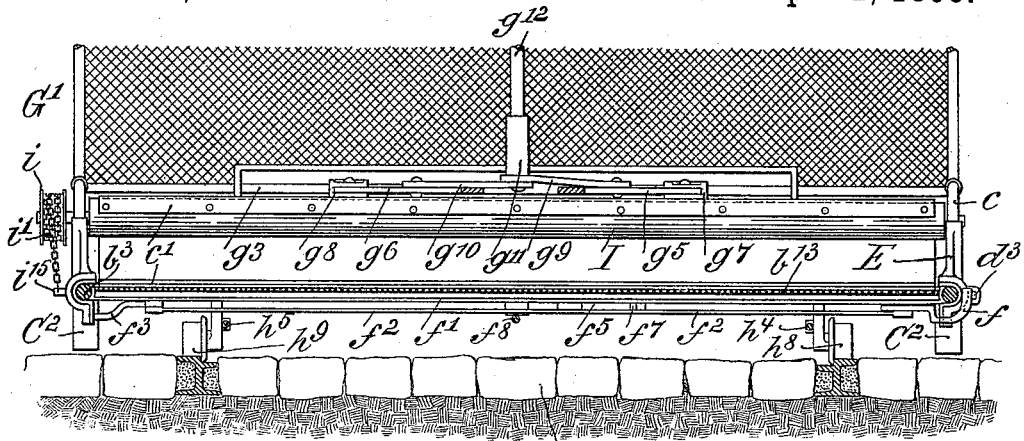
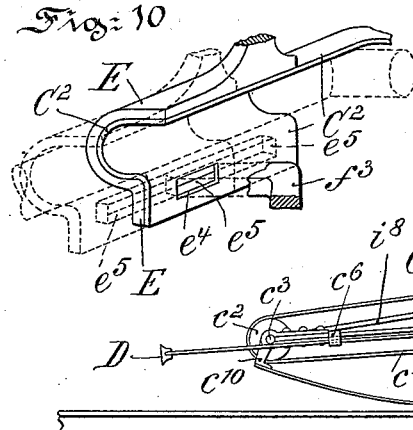
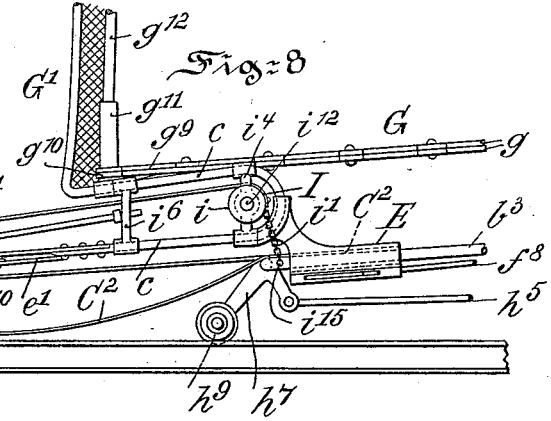
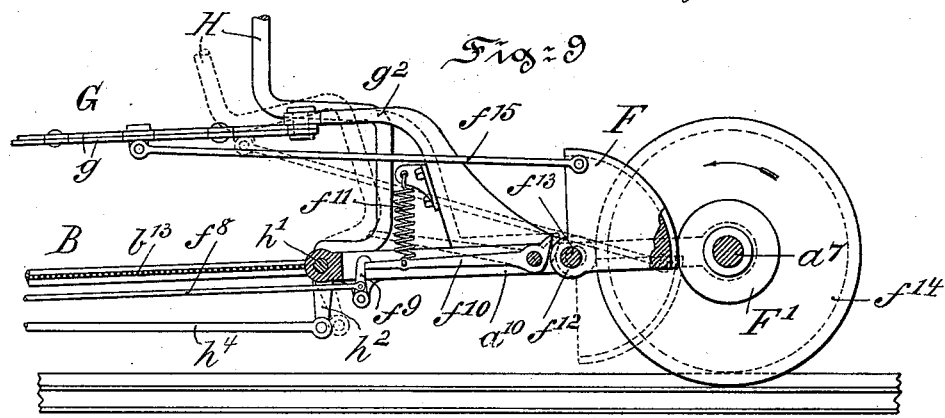
Witnesses:
Wilhelm Vogt
Thomas M. Smith
Inventor
Worthington B. Thomas,
By J. Walter Douglas
Attorney (No Model.) 4 Sheets—Sheet 4.
W. B. THOMAS.
CAR FENDER.
No. 536,665. Patented Apr. 2, 1895.
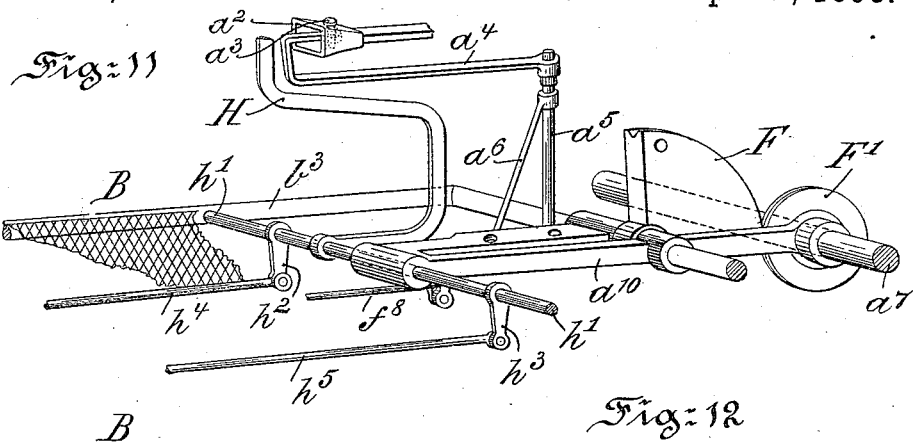
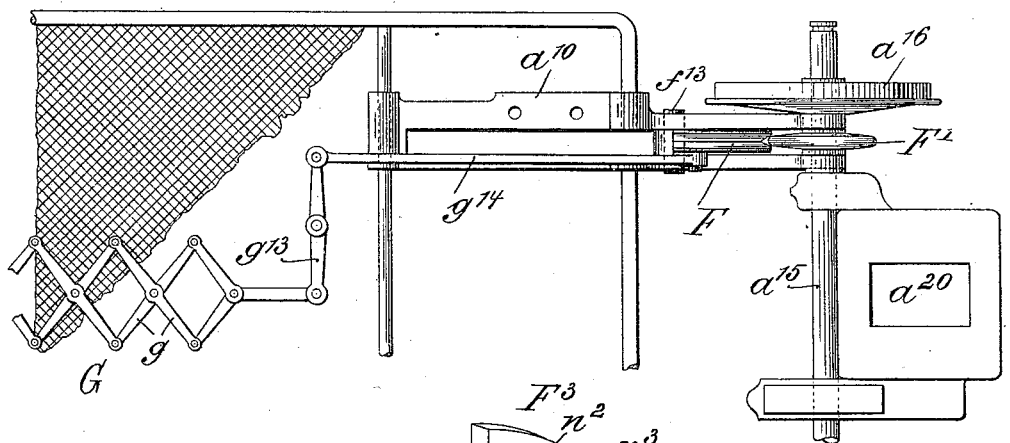
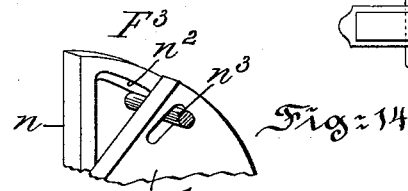
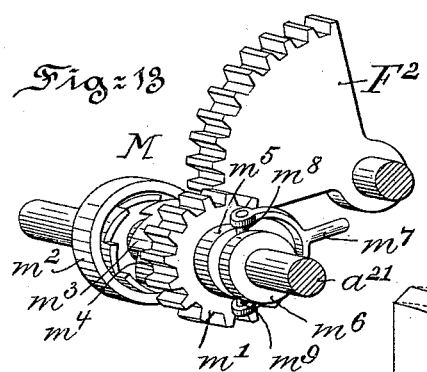
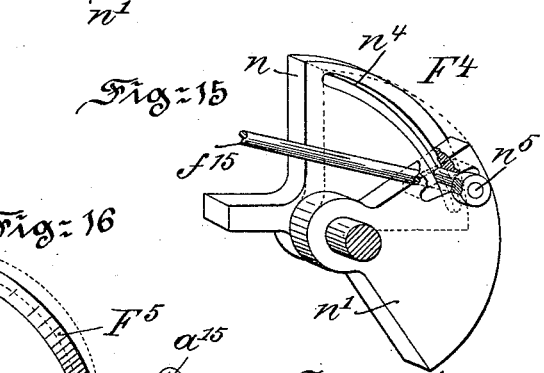
Witnesses:
Wilhelm Vogt
Thomas M. Smith
Inventor:
Worthington B. Thomas,
By J. Walter Douglass
Attorney

UNITED STATES PATENT OFFICE.

WORTHINGTON B. THOMAS, OF PHILADELPHIA, PENNSYLVANIA.

CAR-FENDER.

SPECIFICATION forming part of Letters Patent No. 536,665, dated April 2, 1895.

Application filed November 19, 1894. Serial No. 529,243. (No model.)

*To all whom it may concern:*

Be it known that I, WORTHINGTON B. THOMAS, a citizen of the United States, residing at the city of Philadelphia, in the county of Philadelphia and State of Pennsylvania, have invented certain new and useful Improvements in Car-Fenders, of which the following is a specification.

My invention has relation to an appliance for trolley or other cars to prevent loss of life or limb; and it relates more particularly to the general construction, arrangement and mode of operation thereof.

The principal objects of my invention are, first, to provide a comparatively simple, durable and effective fender or safety appliance for motor-cars for preventing loss of life or limb; second, to provide a fender or safety appliance arranged so as to be actuated by the impact of a person against one member thereof, to cause the same to travel in a direction opposite to that of the moving car and to safely carry the person thereon; third, to provide a fender, life guard or safety device operating automatically by an object brought in the path of the same to travel in a reverse direction to that of the moving car with the person safely supported thereon; fourth, to provide a life guard or fender in pivotal connection with a car and adapted to travel therewith and to be automatically operated so as to travel in an opposite direction to the moving car, when an object is brought in the path thereof; fifth, to provide a fender or life guard in movable connection with a car and traveling therewith and arranged so that an object brought in the path of the same, causes a mechanism to be actuated, whereby a movable apron or carrier for the reception of a person will be conveyed in an opposite direction to that of the car and with means adapted to be operated so as to return the appliance to initial position and for maintaining the same in such position until by the impact or blow of an object in the path of the appliance, a reverse operation thereof is effected; sixth, to provide a fender, life-guard or safety appliance for motor-cars movably connected with a truck, the construction being such, that by the impact of an object against one member thereof a movable apron, carrier or scoop is actuated and having means to permit of the apron, carrier or scoop being caused to assume its normal position; seventh, to provide a fender, life-guard or safety appliance for motor cars movably connected therewith and arranged so as to automatically travel in a certain direction to the movement of the car and manually returned to normal position and having means connected therewith for overcoming obstructions in the roadway by the rising of the framework supporting the device or appliance under the influence of traction wheels or similar appliances; eighth, to provide a fender, life-guard or safety appliance for motor-cars so arranged in connection with the car as that by a pressure exerted against one member of the appliance, a movable apron, carrier or scoop is caused to travel in an opposite direction to and at a speed differing from that of the car and adapted to be actuated so as to assume subsequently a relatively abnormal position through the frictional engagement of a device connected with the truck of the car and then to be returned to initial position; ninth, to provide a fender, life-guard or safety device for motor-cars automatically operating to lessen the thud or blow of a person caught and carried thereon, and, tenth, to provide a fender, life-guard or safety appliance adapted to be so operated as to travel in a reverse direction to that of the car.

My invention consists of a fender, life-guard or safety appliance for trolley and other motor-cars constructed, arranged and adapted for operation in substantially the manner hereinafter described and claimed.

The nature, scope and general features of my invention will be more fully understood from the following description taken in connection with the accompanying drawings forming part hereof; and in which—

Figure 2:
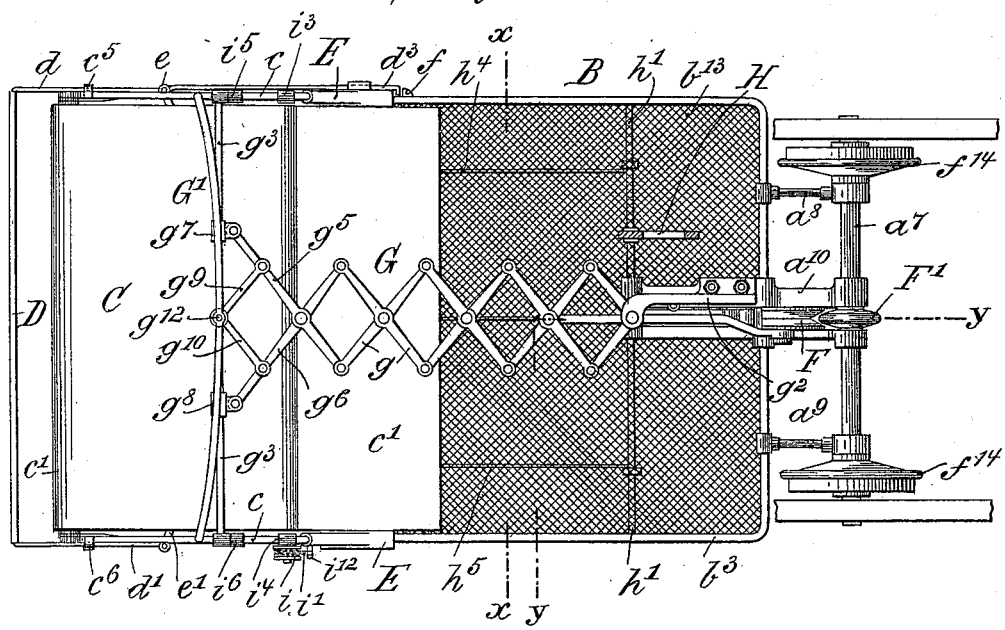

Figure 1, is a side elevational view of a fender, life-guard or safety appliance embodying features of my invention, showing in full lines the normal position thereof and in dotted lines the position it assumes in the travel of the appliance. Fig. 2, is a top or plan view thereof, showing the detail arrangement of the lazy-tong device, trigger-frame and the actuating mechanisms therefor. Fig. 3, is a front view of the fender, life-guard or safety appliance. Fig. 4, is a view partly in plan and partly in broken section of the apron, carrier or scoop, trigger-frame and its actuating mechanism and the wire frame-work or platform of the appliance. Fig. 5, is a detail view, showing a modified form of means for actuating the rear rotary and traveling roller for the apron, scoop or carrier in engagement with the wire or perforated platform or framework of the appliance. Fig. 6, is an end view, showing the manner of supporting one of the series of front rolls to position on a shaft and so as to permit of the travel of the apron, scoop or carrier around the same. Fig. 7, is a cross-sectional view on the line $x$—$x$, of Fig. 2, and a rear view of the wire dash-board or guard of Figs. 1 and 3. Fig. 8, is a side elevational view on an enlarged scale of a portion of the fender, life-guard or carrier and the traction-wheels for raising and lowering the appliance and its connected actuating mechanism. Fig. 9, is a view partly in section taken on the line $y$—$y$, of Fig. 2, and partly in side elevation, showing the actuating mechanism of the lazy-tong device of the fender or life guard appliance and the operating lever for permitting of the raising and lowering of the appliance by means of the pivotal traction wheels illustrated in Fig. 8. Fig. 10, is a perspective view of the slider on each side of the appliance provided with an oblong slot and the slider adapted to be connected with the frame of the apron, carrier or scoop, the extremities of a spring metal dished or arched sheet trailer being in engagement with said slider movably engaging the side bars of the supporting frame of the appliance, also showing one of the pawl-levers engaging an opening in the trailer and a slot in the slider, the latter being controlled by the trigger-frame, and in dotted lines is shown the range of movement of the slider, when an object is brought against the trigger-frame and before release of said pawl-levers from the sliders. Fig. 11, is a detached view, in perspective, of the frame for supporting the fender and its actuating mechanism, showing one mode of connecting the same with the draw-head of the car and showing also the sector or cam in engagement with a roll on a cross-shaft for controlling the speed of movement of the lazy-tong device of Figs. 1, 2 and 8. Fig. 12, is a slightly modified form of friction actuating mechanism for operating the lazy-tong device of the appliance mounted on and actuated by a roll on the front axle of the motor-car. Fig. 13, is a sector gear mechanism with a clutch operated from one of the axles of the car for controlling the movement of the lazy-tong device of the appliance. Fig. 14, is a similar view of a modified form of sector, cam or quadrant consisting of two complemental members, whereof one is movable provided with a slot and has a pin therein engaging the concave portion of the other fixed member, the arrangement being such that the respective members may be brought into and out of engagement with a friction roll connected with the motor-car to control the movement of the lazy-tong device of the appliance. Fig. 15, is a similar view of a further modified form of sector, quadrant or cam, consisting of two members, whereof one is fixed and the other is movable, the latter being provided with a pin engaging a slot in the fixed member and adapted to be brought into and out of contact with a roller connected with the car or fender, one of said members provided with a lever shown in broken section and adapted to be connected at its opposite end to the lazy-tong device fulcrumed to the supporting frame of the appliance, illustrated in Figs. 1, 9 and 12; and Fig. 16, is a similar view of a further modified form of a cam or quadrant adapted to frictionally contact with a roll of the car or fender to impart motion to the sector or quadrant and in turn to the lazy-tong device to cause a certain movement of the apron, scoop or carrier.

Referring to the drawings, A is the car provided with a front platform $a$, and with a dash-board or front $a'$.

$a^2$, is the draw-head of the car provided with a neck suitably supported in movable connection with the car. This draw-head is provided with a coupling pin $a^3$, as clearly illustrated in Fig. 11. The draw-head $a^2$, has extending therefrom rearwardly an angular supporting rod or bar $a^4$, which is connected with a vertical rod $a^5$, provided with a brace $a^6$. This rod and brace are secured to a frame B, forming an oblong platform for the mechanism and appliances of my invention to be hereinafter fully explained. This platform B, as illustrated in Fig. 2, is coupled to the axle $a^7$, which is located under the car A, by means of links $a^8$ and $a^9$. These links support the rear portion of the platform to required position in conjunction with a bifurcated bracket $a^{10}$, which is secured thereto and to the axle $a^7$, as clearly illustrated in Fig. 2.

The front portion of the platform B, is held to required position by means of traction wheels to be hereinafter fully explained.

$b$, is a spring metal or woven wire sheet secured to the frame $c$, of the fender or safety appliance C.

$c'$, is an apron, scoop or carrier. The metal sheet $b$, constitutes a supporting means for the bearings of a series of rolls $c^2$, around which the apron, scoop or carrier $c'$, is permitted to travel in a manner to be presently described. This apron, carrier or scoop $c'$, is rigidly connected at one end to the platform B, and it is composed of duck, leather, woven or other flexible material, and at the other end it is connected with a roll journaled to the side frames $c$, of the apron, scoop or carrier $c'$.

The platform B, is provided with a meshed wire bottom or body $b^{13}$, as fully illustrated in Figs. 2 and 4. The apron, carrier or scoop $c'$, at the front of the appliance is carried around a series of rolls $c^2$, as clearly shown in Fig. 4. These rolls are loosely mounted on a shaft $c^3$, which is journaled to the frame $c$.

$c^4$, is a series of bearings secured at one end to the metal or other sheet $b$, and at the other end they engage the shaft $c^3$, between companion rolls $c^2$, of the series loosely mounted on the shaft $c^3$.

$c^5$, and $c^6$, are guides or ways formed with the side bars of the frame $c$, and through which is afforded a range of movement arms $d$ and $d'$, of a trigger-frame D, as clearly illustrated in Figs. 2 and 4. These arms $d$ and $d'$, are connected with bell cranks $e$ and $e'$, by means of a connecting rod $e^2$. The arm $d$, of the trigger-frame D, is provided with a pawl lever $d^3$, which engages a locking pawl-lever $f$, provided with a tongue $f^{15}$, adapted to engage a slotted slider E, for a purpose to be hereinafter fully explained and as clearly illustrated in Fig. 4. The locking pawl-lever $f$, is pivoted to a cross-rod $f'$, attached to the frame of the platform B, as clearly shown in Figs. 4 and 7. This locking pawl-lever $f$, is also in pivotal connection by means of a connecting rod $f^2$, with a locking pawl-lever $f^3$, fulcrumed to the cross-bar $f'$. The locking pawl-levers $f$ and $f^3$, engage respectively with the pawl-lever $d^3$, and an opening $e^4$, in the extremity of the dish or arch shaped trailer located beneath the frame $c$, and a slot $e^5$, in the slider E. The slider E, is on each side fixed at one end to the rear curved portion of the frame $c$, and is in sliding engagement with the side bars $b^3$, of the frame of the platform B, as clearly illustrated in Figs. 4, 7, 8 and 10. To the fixed cross-bar $f'$, is pivoted a bell crank-lever $f^5$, one member of which engages between pins $f^6$ and $f^7$, of the connecting rod $f^2$, to limit the to and fro movement thereof and the other member is connected with a rod $f^8$, extending rearwardly and engaging a pawl $f^9$, as illustrated in Fig. 9, which is journaled to the bifurcated bracket $a^{10}$, of the platform B, as illustrated in Figs. 2, 11 and 12. The pawl $f^9$, normally engages one extremity of a cam-lever $f^{10}$, which is pivoted in the bifurcated bracket $a^{10}$, and held under tension by means of a coiled spring $f^{11}$, connected with a curved projecting bracket $g^2$, as clearly illustrated in Fig. 9. The cam of the lever $f^{10}$, is normally held out of contact with the hub $f^{12}$, of a sector, quadrant or similar device F, which is journaled to the forked arms of the bracket $a^{10}$, by means of the pivot $f^{13}$. This sector, cam or quadrant F, is adapted to frictionally contact with a roll F', which is rigidly mounted on the shaft or axle $a^7$, provided with traction wheels $f^{14}$, as shown in Fig. 2, or it may be connected with a separate truck located in front or under the car.

The sector, cam or quadrant F, at one end is provided with a rod $f^{15}$, as illustrated in Figs. 2 and 12, and at the opposite end this rod is in pivotal connection with a lazy-tong device G. This device consists of a series of connected links $g$, as illustrated in Figs. 1 and 2, and which device is connected at one end to a vertical meshed wire dash or guard G', and at the other end it is in pivotal connection with the curved projecting bracket $g^2$, secured to the bifurcated bracket $a^{10}$, as clearly illustrated in Figs. 2 and 9. The wire guard or dash G', is preferably formed integral with the frame $c$, as clearly illustrated in Figs. 1, 2 and 8. The wire guard or dash G', at the bottom is provided with a cross-bar $g^3$, rigidly secured thereto and the outer links $g^5$ and $g^6$, of the lazy-tong device G, at the front by means of sleeves $g^7$ and $g^8$, are in sliding engagement with the said bar $g^3$, while one of the inner links $g^9$, is provided with a sleeve $g^{11}$, engaging a vertical rod $g^{12}$, and the other link $g^{10}$, is in movable engagement with the vertical rod $g^{12}$, of said wire guard or dash G', as clearly illustrated in Figs. 1, 7 and 9, whereby in the operation of said device greater freedom of movement of the same is insured in the operation of the same by the cam, sector or quadrant F, frictionally contacting with the roll F'.

H, is an angular operating lever provided with a handle $h$, as clearly illustrated in Figs. 1 and 11. This operating lever extends upwardly in front of the dash-board $a'$, of the car and is mounted upon a cross-shaft $h'$, located beneath the car and journaled to the side bars $b^3$, of the frame-work of the platform B. Mounted on the shaft $h'$, are cranks $h^2$ and $h^3$, which are in pivotal connection with longitudinal rods $h^4$ and $h^5$. These rods at their opposite ends are pivoted to bell cranks $h^6$ and $h^7$, as illustrated in Fig. 4, and having journaled to one member of both of them flanged wheels $h^8$ and $h^9$, as clearly illustrated in Figs. 1, 4, 7, 8 and 11, and adapted to normally travel in engagement with tracks or rails of the road-bed. By the manipulation of the lever H, the forward arms of the bell cranks $h^6$ and $h^7$, carrying the track-wheels $h^8$ and $h^9$, are adapted to assume a vertical position and thereby to elevate the fender so as to overcome any obstacle or obstruction encountered in the travel of the car, with the appliance of my invention connected therewith in order that in normal position of the parts of the fender in the travel of the car, such may not interfere therewith.

$C^2$, is a dish or arch-shaped sheet of metal, which is designated as a "trailer," secured at one end to the slider E, on each side of the frame-work B, as shown in Figs. 8 and 10, and at the opposite end it is rigidly secured to brackets $c^{10}$, journaled to the shaft $c^3$.

It may be here remarked that the arched or dished trailer of the appliance is adapted to support the trigger-frame D, and front portion of the scoop, carrier or apron $c'$, clear of the road-bed $A^2$, or of any obstacles disposed in the path thereof as well as to afford a rise and fall of both members of the appliance with the inequalities of the road-bed $A^2$; and moreover, to cause the fender to assume a position close to the road-bed so that from any cause a person may not be carried under the same, but always dumped upon and carried by the apron, carrier or scoop $c'$, whereby any tendency to accidental injury to the person, is entirely obviated.

Taken in connection with Fig. 10, of the drawings, it may be here remarked that the rear extremity of the trailer on each side is in movable engagement with the slider E. If from any cause the person should seize the dash or guard $G'$, or any part of the apron, scoop or carrier $c'$, without actuating necessarily the trigger frame D, the slider E, on each side will have imparted thereto a slight rearward movement before the pawl levers $f$ and $f^3$, are released from their engagement with the slots $e^4$ and $e^5$, located respectively in the slider E, and extremity of the trailer $C^2$.

It will be observed with special reference to Fig. 4, of the drawings that the trigger-frame D, is carried by the frame $c$, of the apron, scoop or carrier $c'$, as well as the bell crank mechanism which is adapted to operate the pawl-levers $d^3$, $f$ and $f^3$, into and out of engagement with each other and with the slots of the slider E, and rear extremity of the trailer $C^2$, producing thereby the same movement as hereinbefore explained; and also during this rearward movement the apron, scoop or carrier $c'$, will commence to roll upon the roll I, journaled to the frame-work $c$, of the appliance, through the action of the pulley $i$, and chain $i'$, and by which time the lazy-tong device G, will be brought into action through the cam, sector or quadrant F, and friction-roll $F'$, to thereby take up and complete the rearward movement of the appliance and therewith the apron, scoop or carrier will wind upon the roll I, so as to maintain the same taut during such movement of the appliance with the person safely carried thereon. The said chain $i^2$, is secured at one end to the pulley $i$, and at the other end to a pin $i^{15}$, which extends laterally from one of the side-bars $b^3$, of the frame-work of the platform B.

The roll I, upon which the apron, carrier or scoop C, is wound is journaled to link bearings $i^3$ and $i^4$, which by means of collars are rigidly secured to the frame $c$. The upper and forward extension of the frame $c$, constitutes the framework of the wire dash or guard $G'$, as clearly illustrated in Figs. 1, 7 and 8.

$i^5$ and $i^6$, are bearing links on both sides of the appliance and connected with the frame $c$, for strengthening the front portion thereof and holding this frame $c$, formed into an inverted U-shape on each side, a proper distance apart. Connected with the links $i^5$ and $i^6$, are braces $i^7$ and $i^8$, as clearly illustrated in Figs. 4 and 8. Between the links $i^5$ and $i^6$, on both sides and the front end of the frame $c$, is interposed a sheet or strip of spring metal $i^{10}$, in order to increase the yielding properties of the fender with the weight of the object supported on the apron, scoop or carrier $c'$, thereof.

It will be understood that the brace-rods $i^7$ and $i^8$, control the extent of yielding movement of the metal sheet in an upward direction as well as a like movement of the fender and due to the spring action of the arched trailer it is adapted at such time, owing to its contour to assume a plane substantially parallel with the road-bed, but above the same, thereby maintaining the pawl-levers $f$ and $f^3$, in their slots $e^4$ and $e^5$, and preventing the car in motion from causing a disengagement of said pawl-levers, until the proper time, and so as to permit of the travel of the fender rearwardly, as hereinbefore explained.

With reference to Fig. 5, instead of employing a chain and pulley for winding up the apron, scoop or carrier $c'$, of the fender proper, a toothed wheel $I'$, may be employed on the end of the shaft $i^{12}$, and which may be caused to mesh with the wire $b^{13}$, of the platform B, or in any other preferred manner.

In Fig. 12, showing a modification of my invention, the lazy-tong device G, at the rear thereof is connected with a fulcrumed lever $g^{13}$, one end of which lever by means of a rod $g^{14}$, is in pivotal connection with a grooved sector, cam or quadrant F, engaging a complemental roll $F'$, which in this instance is mounted upon the front axle $a^{15}$, of a motor-car, for example, as is illustrated in Fig. 1, upon which axle is connected the motor $a^{20}$, and traction wheels $a^{16}$. In other respects the fender or safety appliance is the same, as well as the mechanism hereinbefore explained, for causing the lazy-tong device G, to be brought into action for performing the functions and operations of the fender of my invention.

In Fig. 13, is illustrated a toothed sector $F^2$, which meshes with a complemental gear-wheel $m'$, adapted to be connected either with the axle $a^{15}$, of the car or with a separate shaft $a^{21}$, located in any preferred manner in connection with the car. This shaft $a^{21}$, is provided with a clutch M, consisting of two members $m^2$ and $m^3$, whereof one is rigidly secured to the shaft $a^{21}$, and the other to the hub $m^4$, of the gear-wheel $m'$. This gear-wheel $m'$, is provided with two collars $m^5$ and $m^6$, engaged by a bifurcated lever $m^7$, through the intervention of pins $m^8$ and $m^9$, between the divided collars of the gear-wheel $m'$, in order to shift said gear-wheel into and out of engagement with the toothed sector, cam or quadrant $F^2$. This bifurcated lever may be actuated by means of an operating rod in pivotal connection with the car and to be controlled by the motor-man in charge thereof, or this clutch mechanism for throwing said toothed sector, cam or quadrant $F^2$, into engagement with its complemental gear-wheel $m'$, may be operated in any other preferred manner. It will be understood that the operation of these two members into and out of engagement with each other is for the purpose, in the one instance, of causing the lazy-tong device to be manipulated so as to permit of a rear movement of the fender after the trigger-frame D, has been operated upon by the impact of an object against the same, to cause the apron, carrier or scoop $c'$, of the fender to be released so as to be wound on the roll I, in such manner as that the same will be maintained taut during the rearward or other movement of the appliance of my invention with the person safely carried thereon and without fear of being maimed or suffering loss of limb.

In Fig. 14, is illustrated a still further modification of the sector, cam or quadrant $F^3$, consisting of two members $n$ and $n'$, whereof one is fixed to a shaft and the other is movable in the radial opening $n^2$, of the member $n$, so as to limit the range of movement of the movable member by means of a pin $n^3$.

In Fig. 15, is illustrated a further modified form of a sector, quadrant or cam $F^4$, consisting as in Fig. 14, of two members $n$ and $n'$, whereof one is fixed and the other is movable. The fixed member $n$, is provided with a slot $n^4$, engaged by a pin $n^5$, of the movable member $n'$. $f^{15}$, is a rod connected with said movable member $n'$, and with the rear end of the lazy-tong device G.

In Fig. 16, is shown a still further modification of the cam or sector device. In this instance it consists of one member $F^5$, having a smooth peripheral surface and adapted to be mounted on a shaft $f^{13}$. This sector or similar device is frictionally engaged by a roll $F^6$, mounted on a shaft $a^{15}$, $a^{21}$ or $a^7$, as illustrated in Figs. 1, 2, 11 or 12.

It may be here remarked that one member of the bell crank lever $e'$, is provided with a spring $e^{15}$, which when the trigger lever is struck or receives an impact from an object, assists in the release of the levers $d^3, f$ and $f^3$, from their connection with the devices hereinbefore fully explained.

In the operation of my invention with reference to Figs. 1 to 11 or 12, it will be observed that when the trigger-frame D, is actuated by the impact of an object against the same, or the guard or dash G', is struck by an object, or the scoop, apron or carrier $c'$, is seized by a person, the pawl levers $f$ and $f^3$, will be released from the slots $e^4$ and $e^5$, of the trailer $C^2$, and sliders E, and the lazy-tong device G, will then begin its movement through the spring controlled cam lever $f^{10}$, assuming the position indicated in dotted lines in Fig. 9, by the previous operation of the bell crank lever $f^5$, and connecting rod $f^8$, releasing the same and causing thereby the sector, cam or quadrant to frictionally contact with the rapidly rotating roll F', on either the axle $a^7$, or shaft $a^{15}$ or $a^{21}$, and which device moves at first rapidly and then slowly as the fender approaches its extreme rearward movement by the bringing together of the parts of said lazy tong device side by side and until the car has been brought to a full stop by the motor-man in charge. During the rearward movement of the fender, the apron, scoop or carrier $c'$, will be wound onto the roll I, by the mechanism hereinbefore described in such manner as that the same may be held taut during such movement of the fender. When the fender has assumed the position indicated in dotted lines in Fig. 1, by that time the car will have been brought to a full stop and the object can then be removed. It may be here remarked that with an object supported on the fender, any weight brought to bear upon the same will cause the trailer $C^2$, in some instances, to be brought close to the road-bed and assume such a form as that it will be absolutely impossible for a person struck by the trigger-frame, guard or apron to be carried under the appliance and crushed or maimed in body or limb. Moreover, any canting of the fender that would be likely to occur during the casting of a person upon the same by reason of the shape of the trailer, will always be in one direction and that is downward from a point about midway in the length thereof to the forward extremity of the same, and at the same time acting in conjunction with the fender as a means of lifting, as it were, the object struck by the trigger frame onto the scoop or apron. It may be furthermore remarked that the shaft $c^3$, is so constructed as that, the rolls upon which the same are mounted, will insure the necessary yielding thereat. In a word, the fender proper is constructed so that the metal parts thereof shall not bruise or maim an object cast upon the same, but act as a couch or cushioned apron or carrier for the reception of the object.

It will be manifestly obvious to those skilled in the art to which my invention appertains, that modifications may be made in the construction and arrangement of the fender of my invention, without departing from the scope thereof; and hence I do not wish to be understood as limiting myself to the precise construction and arrangement of the parts of the same as hereinbefore described and illustrated; but

Having thus described the nature and objects of my invention, what I claim as new, and desire to secure by Letters Patent, is—

1. A car fender, comprising a carrier-apron connected with a platform, a movable trigger-frame arranged in advance of said apron and actuated by the impact of an object to set in action a bell crank pawl locking mechanism, and means controlled by a cam adapted to contact with a roll on a shaft to cause a movement of said carrier-apron and therewith a vertical dash-board and a lazy tong device connected therewith substantially as and for the purposes set forth.

2. A car fender, comprising a frame provided with a carrier-apron, a trigger-frame arranged in advance of said apron and operated by the impact of an object against the same or said apron, a cam adapted to engage a roll and intermediate mechanism between said apron and cam, substantially as and for the purposes set forth.

3. A car fender, comprising a frame having a cushioned carrier-apron with a wire guard or dash, a trigger frame arranged in advance of said apron and actuated by the impact of an object against the same to disengage locking devices, a cam, an actuated roll brought into engagement with said cam, intermediate mechanism connected with said apron and cam and means for raising and lowering said apron, substantially as and for the purposes set forth.

4. A car fender, comprising a carrier-apron, a dash-board, a lazy tong device connected therewith, friction means connected with said device and with a shaft, a trigger frame located in advance of said apron and actuated by the impact of an object against the same to cause said carrier-apron to travel and therewith said dash-board, substantially as and for the purposes set forth.

5. A car fender, comprising a carrier-apron, a trigger-frame disposed in advance of said apron and operated by the impact of an object to cause said apron to be released from its fixed position, and friction means consisting of two members, one mounted on a shaft and the other adapted to engage therewith to cause a movement of said carrier-apron in an opposite direction to that of the moving car and to be held taut in such movement of the same, substantially as and for the purposes set forth.

6. A car fender, comprising a carrier-apron winding in the travel thereof, a dash-board supported above said apron, a lazy-tong device connected with the frame of said apron and afforded certain movements by means of a cam mechanism, the cam of which frictionally contacts with a rotary member on a shaft, substantially as and for the purposes set forth.

7. A car fender, comprising a carrier-apron, a trigger-frame arranged in advance of said apron and actuated by the impact of an object in the path thereof to cause the release of a bell crank pawl locking mechanism and said carrier-apron to be moved in a direction opposite to that of the moving car and with said apron held taut during its travel, means carrying rolls and operated by a lever to raise and lower said apron, a dash-board and a lazy tong device connected therewith and adapted to actuate said board during the movement of said apron, substantially as and for the purposes set forth.

8. A car fender provided with a carrier-apron adapted to be moved rearwardly to the travel of a car, a vertical dash-board, a lazy-tong device connected therewith, and a cam-mechanism, the cam of which contacts with a rotary member of the car, substantially as and for the purposes set forth.

9. A car fender provided with a traveler carrier apron winding upon a roll, a lazy-tong device, a trailer located beneath said apron and connected with the frame thereof and with sliders, means for elevating and lowering the appliance, and means for controlling said lazy-tong device to permit of the actuation of said apron, substantially as and for the purposes set forth.

10. A car fender, comprising a traveler carrier-apron, a trigger-frame arranged in advance of said apron and actuated by the impact of an object in the path thereof to cause the release of a bell-crank pawl locking mechanism, a lever and mechanism connected with bell cranks provided with wheels, for elevating and lowering said apron, substantially as and for the purposes set forth.

11. A car fender, comprising a carrier-apron adapted to wind upon a roll during the travel thereof, a trigger-frame located in advance of said apron and actuated by the impact of an object upon the appliance to release a bell crank pawl locking mechanism, a cam-mechanism, the cam of which frictionally contacts with a rotary member mounted on a shaft for actuating said apron, a lever and mechanism for raising and lowering said apron, substantially as and for the purposes set forth.

12. A car fender, comprising a traveler carrier apron, a lazy-tong device and friction devices actuated from the front axle of the car for controlling said lazy-tong device, substantially as and for the purposes set forth.

13. A car fender, comprising a carrier-apron, a vertical dash-board, a lazy-tong device, a trigger-frame arranged around and beyond the front of said apron and mechanism for actuating said lazy tong device and winding said apron and a cam-mechanism, the cam of which is adapted to engage a rotary member of the car mounted on a shaft located beneath the same, substantially as and for the purposes set forth.

14. A car fender provided with a lazy-tong device and frictional mechanism connected therewith and with the axle of a car for controlling the movement thereof, substantially as and for the purposes set forth.

15. A car fender, comprising a carrier-apron in sliding engagement with a platform, means for winding up said apron, a vertical dash-board, a lazy-tong device connected therewith and means for raising and lowering said apron operated by a lever from the platform of the car, substantially as and for the purposes set forth.

16. A car fender, comprising a carrier-apron provided with a trailer and sliders, a trigger-frame and means, substantially as described, for permitting of the movement of said apron in either direction, substantially as and for the purposes set forth.

17. A car fender, comprising a carrier-apron adapted to be wound on a roll in a certain movement of the same, a trigger-frame normally holding said apron in an extended position and releasing a locking mechanism by the impact of an object against said frame or apron, a wire guard or dash, a lazy tong device connected therewith, and means for actuating said device under the control of a cam adapted to engage a rotary device located beneath the car, substantially as and for the purposes set forth.

18. A car fender, comprising a flexible carrier-apron, an arched trailer, a trigger for releasing said carrier-apron, a lazy-tong device and frictional means controlled by intermediate mechanism for causing a movement of said carrier-apron, in either direction substantially as and for the purposes set forth.

19. A car fender provided with an arched trailer, a trigger, a carrier apron, and means for actuating the same, substantially as and for the purposes set forth.

20. A car fender provided with means for actuating the same in a direction opposite to that of the moving car, a lever and intermediate mechanism connected with bell cranks provided with traction wheels, substantially as and for the purposes set forth.

21. A car fender, comprising a carrier-apron provided with a vertical wire guard or dash, a trigger frame arranged in advance of said carrier-apron and actuated by the impact of an object against the same to cause said carrier-apron to travel rearwardly to the moving car, substantially as and for the purposes set forth.

22. A car fender, comprising a carrier-apron, a trigger device arranged in advance of said carrier apron and adapted to be operated by the impact of an object to set in action a bell crank mechanism controlling the same, pawl-levers controlling a cam-lever adapted to frictionally contact with a cam and the latter engaging a roll on a shaft, substantially as and for the purposes set forth.

23. A car fender, comprising a carrier-apron, a trigger-frame arranged beyond said carrier-apron and actuated by the impact of an object against the same to release a locking mechanism to cause a movement of said apron in an opposite direction to the moving car and a rotary member connected with the car for actuating said carrier-apron, substantially as and for the purposes set forth.

24. A car fender provided with an apron having an arched trailer beneath the same, an intermediate metallic yielding plate or strip, rolls connected with said apron, and over one of which travels said apron, and wound onto the other, and means for actuating the same, substantially as and for the purposes set forth.

25. A car fender, comprising a carrier in sliding engagement with a platform, a lazy-tong device, an arch or dish-shaped trailer located beneath said carrier, bell cranks provided with traction wheels and means for controlling said bell cranks and lazy-tong device, substantially as and for the purposes set forth.

26. A car fender, comprising a carrier, a trigger for releasing the same from its normal position and permitting of the travel of the same in a direction the reverse of the travel of a motor car, means for winding said carrier onto a roll, while in sliding engagement with a platform, a lazy-tong device, and means for actuating the same and therewith said carrier, substantially as and for the purposes set forth.

27. A car fender, comprising a carrier, a bell crank mechanism, a spring controlled cam lever adapted to engage the hub of a sector, cam, a friction wheel mounted on a shaft, a lazy-tong device and means connected with said device and with said sector cam, substantially as and for the purposes set forth.

28. A car fender, comprising a carrier, a spring controlled cam-lever contacting with a sector cam and engaging a wheel mounted on the shaft or axle of a car, a lazy-tong device, and means for imparting motion to said device through the intervention of said sector cam engaging the wheel of said car, substantially as and for the purposes set forth.

29. A car fender provided with a carrier flexibly supported from a frame-work and having a trailer beneath the same adapted to be elevated in the travel thereof, and a lazy-tong device controlled from one of the axles of the motor car, substantially as and for the purposes set forth.

30. A car fender, comprising a flexible carrier, bell cranks provided with traction wheels located beneath the same and means for elevating and depressing said carrier during movement of the car, substantially as and for the purposes set forth.

31. A car fender provided with a carrier, a trailer beneath the same and in movable engagement by slotted sliders, pawl-levers adapted to lock with and to be released from the same, a lazy-tong device, a trigger frame, intermediate mechanism, and means controlled from the axles of the car for actuating said device, substantially as and for the purposes set forth.

32. A car fender, provided with a carrier having a series of rolls loosely mounted on a shaft, the bearings of said rolls extending from said shaft to a metallic sheet interposed between said carrier and yield with the pressure brought to bear upon the same, and means controlled from the motor-car for actuating the said carrier in the travel of the car, substantially as and for the purposes set forth.

33. A car fender, provided with a carrier having a slider in connection with a platform, a trigger-frame and actuating mechanism therefor, means for holding said carrier taut in the travel thereof and winding onto a roll, a lazy-tong device, intermediate mechanism and friction means connected with one of the axles of the car for controlling one movement of said lazy-tong device, substantially as and for the purposes set forth.

34. A car fender provided with a carrier having a slider in movable engagement with a platform, a trigger frame and means for controlling the same and said carrier, substantially as and for the purposes set forth.

35. A car-fender provided with a carrier having sliders in movable connection with a platform, a dash-board or guard, a trigger-frame located beyond and on both sides of said carrier and provided with pawls, a locking mechanism engaged by said pawls, a cam-lever and means for controlling the same, a cam, and a roll mounted on a shaft, substantially as and for the purposes set forth.

In testimony whereof I have hereunto set my signature in the presence of two subscribing witnesses.

WORTHINGTON B. THOMAS.

Witnesses:
THOMAS M. SMITH,
J. WALTER DOUGLASS.